United States Patent
Chaudhary et al.

(10) Patent No.: US 9,824,009 B2
(45) Date of Patent: Nov. 21, 2017

(54) INFORMATION COHERENCY MAINTENANCE SYSTEMS AND METHODS

(71) Applicant: NVIDIA Corporation, Santa Clara, CA (US)

(72) Inventors: Anurag Chaudhary, San Jose, CA (US); Guillermo Juan Rozas, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 441 days.

(21) Appl. No.: 13/725,881

(22) Filed: Dec. 21, 2012

(65) Prior Publication Data

US 2014/0181404 A1   Jun. 26, 2014

(51) Int. Cl.
 *G06F 12/08* (2016.01)
 *G06F 12/0811* (2016.01)
 (Continued)

(52) U.S. Cl.
 CPC ...... *G06F 12/0811* (2013.01); *G06F 12/0815* (2013.01); *G06F 12/0817* (2013.01); *G06F 12/0897* (2013.01)

(58) Field of Classification Search
 CPC ............ G06F 12/0811; G06F 12/0815; G06F 12/0817; G06F 12/082; G06F 12/0822; G06F 12/0824; G06F 2212/622
 (Continued)

(56) References Cited

U.S. PATENT DOCUMENTS 4,620,217 A   10/1986   Songer
4,648,045 A   3/1987   Demetrescu
(Continued)

FOREIGN PATENT DOCUMENTS

CN   1954338   5/2004
CN   101091203   5/2004
(Continued)

OTHER PUBLICATIONS

"Interleaved Memory." Dec. 26, 2002. http://www.webopedia.com/TERM/I/interleaved_memory.html. Sep. 9, 2008, 3 pages.
(Continued)

*Primary Examiner* — Gary Portka

(57) ABSTRACT

Systems and methods for coherency maintenance are presented. The systems and methods include utilization of multiple information state tracking approaches or protocols at different memory or storage levels. In one embodiment, a first coherency maintenance approach (e.g., similar to a MESI protocol, etc.) can be implemented at one storage level while a second coherency maintenance approach (e.g., similar to a MOESI protocol, etc.) can be implemented at another storage level. Information at a particular storage level or tier can be tracked by a set of local state indications and a set of essence state indications. The essence state indication can be tracked "externally" from a storage layer or tier directory (e.g., in a directory of another cache level, in a hub between cache levels, etc.). One storage level can control operations based upon the local state indications and another storage level can control operations based in least in part upon an essence state indication.

19 Claims, 4 Drawing Sheets

(51) Int. Cl.
  *G06F 12/0815* (2016.01)
  *G06F 12/0817* (2016.01)
  *G06F 12/0897* (2016.01)

(58) Field of Classification Search
  USPC .............. 711/119, 122, 141, 143, 144, 145
  See application file for complete search history.

(56) References Cited

U.S. PATENT DOCUMENTS

| | | | |
|---|---|---|---|
| 4,700,319 A | 10/1987 | Steiner | |
| 4,862,392 A | 8/1989 | Steiner | |
| 4,901,224 A | 2/1990 | Ewert | |
| 5,185,856 A | 2/1993 | Alcorn et al. | |
| 5,268,995 A | 12/1993 | Diefendorff et al. | |
| 5,285,323 A | 2/1994 | Hetherington et al. | |
| 5,357,604 A | 10/1994 | San et al. | |
| 5,392,393 A | 2/1995 | Deering | |
| 5,487,022 A | 1/1996 | Simpson et al. | |
| 5,488,687 A | 1/1996 | Rich | |
| 5,491,496 A | 2/1996 | Tomiyasu | |
| 5,577,213 A | 11/1996 | Avery et al. | |
| 5,579,473 A | 11/1996 | Schlapp et al. | |
| 5,579,476 A | 11/1996 | Cheng et al. | |
| 5,581,721 A | 12/1996 | Wada et al. | |
| 5,600,584 A | 2/1997 | Schlafly | |
| 5,604,824 A | 2/1997 | Chui et al. | |
| 5,613,050 A | 3/1997 | Hochmuth et al. | |
| 5,655,132 A | 8/1997 | Watson | |
| 5,701,444 A | 12/1997 | Baldwin | |
| 5,764,228 A | 6/1998 | Baldwin | |
| 5,777,628 A | 7/1998 | Buck-Gengler | |
| 5,831,640 A | 11/1998 | Wang et al. | |
| 5,850,572 A | 12/1998 | Dierke | |
| 5,864,342 A | 1/1999 | Kajiya et al. | |
| 5,941,940 A | 8/1999 | Prasad et al. | |
| 5,995,121 A | 11/1999 | Alcorn et al. | |
| 6,115,047 A | 9/2000 | Deering | |
| 6,166,743 A | 12/2000 | Tanaka | |
| 6,173,366 B1 | 1/2001 | Thayer et al. | |
| 6,222,550 B1 | 4/2001 | Rosman et al. | |
| 6,229,553 B1 | 5/2001 | Duluk, Jr. et al. | |
| 6,259,460 B1 | 7/2001 | Gossett et al. | |
| 6,288,730 B1 | 9/2001 | Duluk, Jr. et al. | |
| 6,333,744 B1 | 12/2001 | Kirk et al. | |
| 6,345,339 B1* | 2/2002 | Arimilli et al. | 711/141 |
| 6,351,806 B1 | 2/2002 | Wyland | |
| 6,353,439 B1 | 3/2002 | Lindholm et al. | |
| 6,407,740 B1 | 6/2002 | Chan | |
| 6,411,130 B1 | 6/2002 | Gater | |
| 6,411,301 B1 | 6/2002 | Parikh et al. | |
| 6,417,851 B1 | 7/2002 | Lindholm et al. | |
| 6,466,222 B1 | 10/2002 | Kao et al. | |
| 6,483,516 B1 | 11/2002 | Tischler | |
| 6,496,537 B1 | 12/2002 | Kranawetter et al. | |
| 6,525,737 B1 | 2/2003 | Duluk, Jr. et al. | |
| 6,526,430 B1 | 2/2003 | Hung et al. | |
| 6,542,971 B1 | 4/2003 | Reed | |
| 6,557,022 B1 | 4/2003 | Sih et al. | |
| 6,597,363 B1 | 7/2003 | Duluk, Jr. et al. | |
| 6,604,188 B1 | 8/2003 | Coon et al. | |
| 6,624,818 B1 | 9/2003 | Mantor et al. | |
| 6,636,221 B1 | 10/2003 | Morein | |
| 6,664,958 B1 | 12/2003 | Lather et al. | |
| 6,717,577 B1 | 4/2004 | Cheng et al. | |
| 6,718,542 B1 | 4/2004 | Kosche et al. | |
| 6,731,288 B2 | 5/2004 | Parsons et al. | |
| 6,734,861 B1 | 5/2004 | Van Dyke et al. | |
| 6,778,181 B1 | 8/2004 | Kilgariff et al. | |
| 6,806,886 B1 | 10/2004 | Zatz | |
| 6,839,828 B2 | 1/2005 | Gschwind et al. | |
| 6,924,808 B2 | 8/2005 | Kurihara et al. | |
| 6,947,053 B2 | 9/2005 | Malka et al. | |
| 6,980,209 B1 | 12/2005 | Donham et al. | |
| 6,980,222 B2 | 12/2005 | Marion et al. | |
| 6,999,100 B1 | 2/2006 | Leather et al. | |
| 7,034,828 B1 | 4/2006 | Drebin et al. | |
| 7,106,336 B1 | 9/2006 | Hutchins | |
| 7,158,141 B2 | 1/2007 | Chung et al. | |
| 7,187,383 B2 | 3/2007 | Kent | |
| 7,257,814 B1 | 8/2007 | Melvin et al. | |
| 7,280,112 B1 | 10/2007 | Hutchins | |
| 7,298,375 B1 | 11/2007 | Hutchins | |
| 7,430,654 B2 | 9/2008 | Huang et al. | |
| 7,450,120 B1 | 11/2008 | Hakura et al. | |
| 7,477,260 B1 | 1/2009 | Nordquist | |
| 7,659,909 B1 | 2/2010 | Hutchins | |
| 7,710,427 B1 | 5/2010 | Hutchins et al. | |
| 7,928,990 B2 | 4/2011 | Jiao et al. | |
| 7,941,645 B1 | 5/2011 | Riach et al. | |
| 7,969,446 B2 | 6/2011 | Hutchins et al. | |
| 8,537,168 B1 | 9/2013 | Steiner et al. | |
| 8,773,447 B1 | 7/2014 | Donham | |
| 8,860,722 B2 | 10/2014 | Cabral et al. | |
| 9,183,607 B1 | 11/2015 | Mahan et al. | |
| 9,411,595 B2 | 8/2016 | Rozas | |
| 2002/0105519 A1 | 8/2002 | Lindholm et al. | |
| 2002/0126126 A1 | 9/2002 | Baldwin | |
| 2002/0129223 A1 | 9/2002 | Takayama et al. | |
| 2002/0169942 A1 | 11/2002 | Sugimoto | |
| 2003/0038810 A1 | 2/2003 | Emberling | |
| 2003/0115233 A1 | 6/2003 | Hou et al. | |
| 2003/0164840 A1 | 9/2003 | O'Driscoll | |
| 2003/0189565 A1 | 10/2003 | Lindholm et al. | |
| 2004/0012597 A1 | 1/2004 | Zatz et al. | |
| 2004/0012599 A1 | 1/2004 | Laws | |
| 2004/0012600 A1 | 1/2004 | Deering et al. | |
| 2004/0024260 A1 | 2/2004 | Winkler et al. | |
| 2004/0100474 A1 | 5/2004 | Demers et al. | |
| 2004/0114813 A1 | 6/2004 | Boliek et al. | |
| 2004/0119710 A1 | 6/2004 | Piazza et al. | |
| 2004/0126035 A1 | 7/2004 | Kyo | |
| 2004/0130552 A1 | 7/2004 | Duluk, Jr. et al. | |
| 2004/0194084 A1 | 9/2004 | Matsunami et al. | |
| 2004/0246260 A1 | 12/2004 | Kim et al. | |
| 2005/0086644 A1 | 4/2005 | Chkodrov et al. | |
| 2005/0122330 A1 | 6/2005 | Boyd et al. | |
| 2005/0134588 A1 | 6/2005 | Aila et al. | |
| 2005/0135433 A1 | 6/2005 | Chang et al. | |
| 2005/0162436 A1 | 7/2005 | Van Hook et al. | |
| 2005/0223195 A1 | 10/2005 | Kawaguchi | |
| 2005/0231506 A1 | 10/2005 | Simpson et al. | |
| 2005/0237337 A1 | 10/2005 | Leather et al. | |
| 2005/0253873 A1 | 11/2005 | Hutchins et al. | |
| 2005/0275657 A1 | 12/2005 | Hutchins et al. | |
| 2005/0280655 A1 | 12/2005 | Hutchins et al. | |
| 2006/0007234 A1 | 1/2006 | Hutchins et al. | |
| 2006/0028469 A1 | 2/2006 | Engel | |
| 2006/0152519 A1 | 7/2006 | Hutchins et al. | |
| 2006/0155964 A1 | 7/2006 | Totsuka | |
| 2006/0177122 A1 | 8/2006 | Yasue | |
| 2006/0268005 A1 | 11/2006 | Hutchins et al. | |
| 2006/0288195 A1 | 12/2006 | Ma et al. | |
| 2007/0030278 A1 | 2/2007 | Prokopenko et al. | |
| 2007/0165029 A1 | 7/2007 | Lee et al. | |
| 2007/0236495 A1 | 10/2007 | Gruber et al. | |
| 2007/0279408 A1 | 12/2007 | Zheng et al. | |
| 2007/0285427 A1 | 12/2007 | Morein et al. | |
| 2007/0288902 A1 | 12/2007 | Lev et al. | |
| 2009/0248983 A1* | 10/2009 | Offen et al. | 711/122 |
| 2010/0023707 A1 | 1/2010 | Hohmuth et al. | |
| 2010/0211933 A1 | 8/2010 | Kiel et al. | |
| 2013/0103912 A1* | 4/2013 | Jones et al. | 711/144 |
| 2014/0181404 A1 | 6/2014 | Chaudhary et al. | |
| 2014/0372990 A1 | 12/2014 | Strauss | |

FOREIGN PATENT DOCUMENTS

| | | |
|---|---|---|
| EP | 1665165 | 5/2004 |
| EP | 1745434 | 5/2004 |
| EP | 1771824 | 5/2004 |
| JP | 05150979 A2 | 6/1993 |
| JP | 11053187 A2 | 2/1999 |
| JP | 2000047872 A2 | 2/2000 |
| JP | 2002073330 A2 | 3/2002 |

(56) References Cited

FOREIGN PATENT DOCUMENTS

| | | |
|---|---|---|
| JP | 2002171401 | 6/2002 |
| JP | 2004199222 | 7/2004 |
| JP | 2006196004 | 7/2006 |
| WO | 2005112592 | 5/2004 |
| WO | 2006007127 | 5/2004 |
| WO | 2005114582 | 12/2005 |
| WO | 2005114646 | 12/2005 |

OTHER PUBLICATIONS

Pirazzi, Chris. "Fields, F1/F2, Interleave, Field Dominance and More." Nov. 4, 2001. http://lurkertech.com/lg/dominance.html. Sep. 9, 2008, 11 pages.

Hennessy, et al., Computer Organization and Design: The Hardware/Software Interface, 1997, Section 6.5 7 pages.

Hollasch; IEEE Standatd 754 Floating Point Numbers; http://steve.hollasch.net/cgindex/coding/ieeefloat.html; dated Feb. 24, 2005; retrieved Oct. 21, 2010 17 pages.

The Free Online Dictionary, Thesaurus and Encyclopedia, definition for cache; http://www.thefreedictionary.com/cache; retrieved Nov. 3, 2012, 3 pages.

Wolfe A, et al., "A Superscalar 3D graphics engine", MICRO-32. Proceedings of the 32nd annual ACM/IEEE International Symposium on Microarchitecture. Haifa, Israel, Nov. 16-18, 1999; 12 pages.

Zaharieva-Stoyanova E I: "Data-flow analysis in superscalar computer architecture execution," Tellecommunications in Modern Satellite, Cable and Broadcasting Services, 2003 4 pages.

"Sideband," http://www.encyclopedia.com/html/s1/sideband.asp 2006, 4 pages.

Pixar, Inc.; PhotoRealistic RenderMan 3.9 Shading Language Extensions; Sep. 1999 20 pages.

Moller, et al.; Real-Time Rendering, 2nd ed., 2002, A K Peters Ltd., pp. 92-99, 2002.

PCT Notificaiton of Transmittal of the International Search Report and the Written Opinion of the International Searching Authority, or the Declaration. PCT/US05/17032; Applicant Nvida Corporation; dated Nov. 9, 2005.

PCT Notificaiton of Transmittal of the International Search Report or the Declaration. PCT/US05/17526; Applicant Hutchins, Edward A; dated Jan. 17, 2006.

PCT Notification of Transmittal of the International Search Report and the Written Opinion of the International Searching Authority, or the Declaration. PCT/US05/17031; Applicant Nvida Corporation; dated Feb. 9, 2007.

\* cited by examiner

200

---

210
Tracking an essence storage state indication and a local storage state indication.

---

220
Acting on information in the one level storage component based upon a local storage state indication.

---

230
Acting upon the information received in another storage component based at least in part on the essence storage state of the information.

FIG 2

INFORMATION COHERENCY MAINTENANCE SYSTEMS AND METHODS

FIELD OF THE INVENTION

The present invention relates to information storage. In particular, the present invention relates to a system and method for tracking cache operations.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. These activities often involve storage of information. The manner in which the electronic devices perform storage operations can have a significant impact on performance and end results. However, traditional attempts at information storage have many limitations and can be very complex and complicated.

Many traditional memory approaches attempt to utilize levels or tiers of memory storage including caches, system memory and bulk memory and with the utilization of multiple levels it is important to maintain information coherency. There are many traditional attempts at cache coherence protocols. Some common cache coherence protocols are organized around simple states that cache lines can be in and the transitions between those states.

In a traditional MESI coherence protocol, cache lines can be one of the following states: Modified, Exclusive, Shared or Invalid. In a Modified state the line is exclusive to a particular cache and has been modified since it was fetched. Upon eviction, the cache line needs to be written back to a home location (e.g. DRAM). In an Exclusive state the cache lines are exclusive to the cache that has them in this state and can thereafter be modified. As there is no modified data, nothing needs to be written back on eviction. In a Shared state the cache lines contain data that other agents may have and if they do, it is the same data. As there is no modified data, nothing needs to be written back on eviction. In an Invalid state the cache line contains no valid data. The line can be re-allocated at will.

There is also a traditional MOESI coherence protocol. In addition to the MESI states, the MOESI protocol introduces the 'Owned' state, which is similar to Shared state except that the line must be written back to the home location upon eviction. The Owned state arises when a line is modified in some cache, and another agent requests it as shared. In a MESI system, the line would be written back to backing store and simultaneously supplied to the agent requesting it shared and transition to shared from the modified state in the original cache. In a MOESI system, the line is not written back, it is just supplied to the agent requesting it shared, but transitions to owned so that the original agent remembers to essentially write it back, although it is no longer allowed to write to it, as it is (potentially) shared with other agents.

Each traditional coherence protocol often has strengths and weaknesses compared to another coherence protocol and traditional approaches of using one coherence protocol are limited in overall efficiency. The MESI protocol is usually simpler to implement, as an agent only needs to write back a line if it has modified it (as indicated by it being in the M state). If a line is modified, it can also be written to, as the line is guaranteed to be exclusive. In the MOESI protocol, an agent has to write back a line if the line has been modified, even if the line can no longer be written to because the line is now in the owned state. Thus, the MOESI protocol includes distinguishing a state (e.g., Owned, etc.) that needs to be written back even though no new writes can be accepted to a line in that state. There are more variants of both protocols.

The MOESI protocol can avoid utilizing as much DRAM bandwidth as the MESI protocol in some situations. For example, when two agents are communicating with one of them writing the data occasionally and the other merely asking for an updated copy, the MOESI protocol typically involves less write backs and consumes less bandwidth to DRAM than the MESI protocol. Typically, in the MESI protocol, every such request for an updated copy would cause the line to be written back to DRAM. In the MOESI protocol, usually only the final eviction of the line by an agent that had modified it would cause DRAM bandwidth to be utilized.

SUMMARY

Systems and methods for coherency maintenance are presented. The systems and methods include utilization of multiple information state tracking approaches or protocols at different memory or storage levels. In one embodiment, a first coherency maintenance approach (e.g., similar to a MESI protocol, etc.) can be implemented at one storage level while a second coherency maintenance approach (e.g., similar to a MOESI protocol, etc.) can be implemented at another storage level. Information at a particular storage level or tier can be tracked by a set of local state indications and a set of essence state indications. The essence state indication can be tracked "externally" from a storage layer or tier directory (e.g., in a directory of another cache level, in a hub between cache levels, etc.). One storage level can control operations based upon the local state indications and another storage level can control operations based at least in part upon the essence state indications.

In one embodiment, a system comprises: a first level storage component in which a storage state indication is tracked externally; and a second level storage component for receiving information from the first level storage component and acting upon the information based at least in part on the storage state of information associated with the first level storage component. In one exemplary implementation, the externally tracked information includes additional information (e.g., more detailed information, refined information, etc.) than what first-level directories otherwise actually indicate (e.g., owned vs. shared). The state of information can be a state of a cache line and the storage state of the cache line can be tracked by the second level storage component. The storage state of the cache line can be tracked by a coherent hub. The first level storage component can be an L2 cache and the second level storage component can be an L3 cache. The storage state of the cache line in the L2 cache can be tracked by the L3 cache or the cache line can be tracked by a coherent hub. The L2 cache can consider the cache line in a MESI state and the L3 can actually track which lines have actually been written back to backing store. In one embodiment, on eviction of a cache line from the L2 cache the L3 cache actually propagates the cache line to the backing store if appropriate and does not propagate the cache line if not appropriate. The L3 can track extra states for each cache line and wherein the extra states indicate if a line is dirty and the L3 directory indicates that the line is to be written back.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 2 is flow diagram of exemplary method in accordance with one embodiment of the present invention.

DETAILED DESCRIPTION

Figure 1:
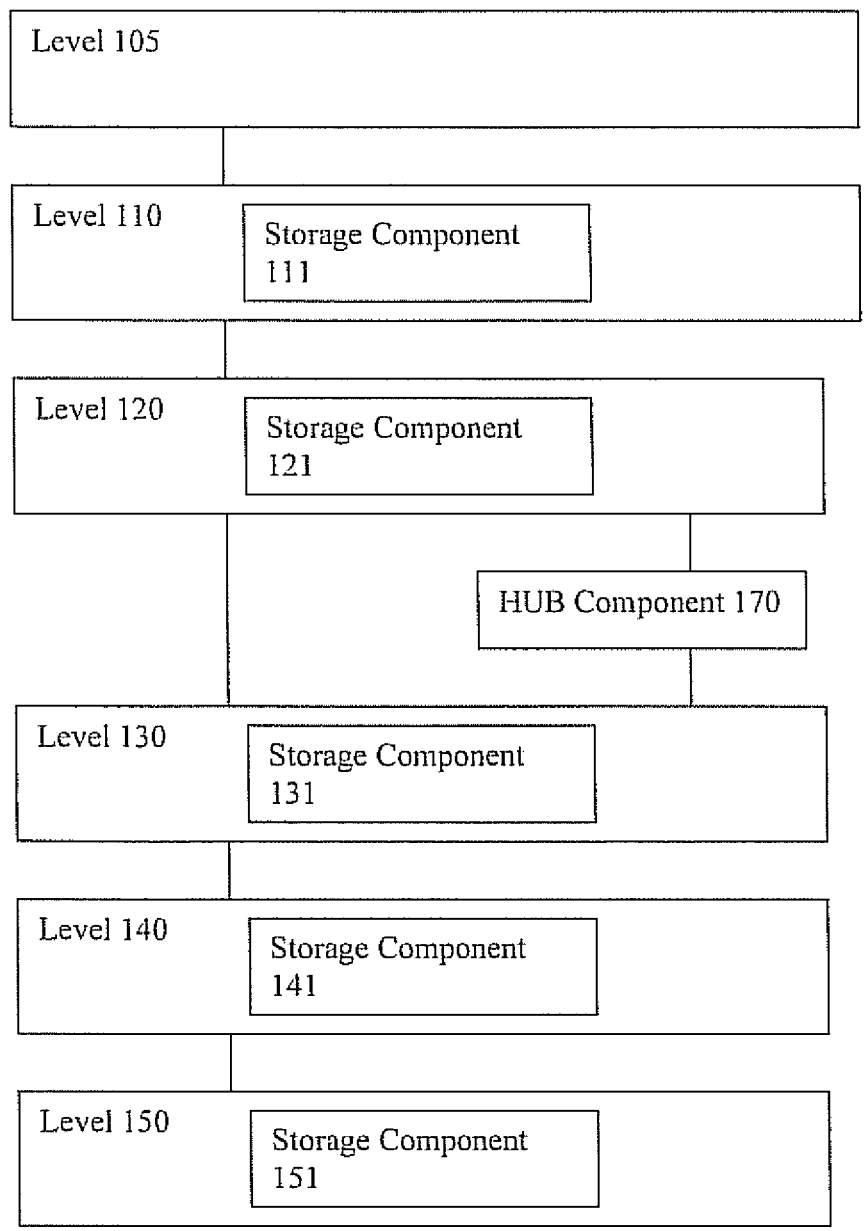
FIG. 1 is a block diagram of an exemplary memory architecture in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Presented systems and methods can facilitate efficient information storage and tracking operations. The systems and methods include utilization of multiple information state tracking approaches or protocols at different memory or storage levels. Information stored at a particular storage level or tier (e.g., L2, L3, main memory, etc.) can be tracked with multiple different state indications and utilization of different sets of state indications can facilitate implementation of different coherency maintenance protocols at different storage or memory levels. In one exemplary implementation, a first coherency maintenance approach (e.g., similar to a MESI protocol, etc.) can be implemented at one storage level while a second coherency maintenance approach (e.g., similar to a MOESI protocol, etc.) can be implemented at another storage level.

In one embodiment, information at a particular storage level or tier is tracked by a set of local state indications and a set of essence state indications. The essence state indication can be tracked "externally" from a storage layer or tier directory (e.g., in a directory of another cache level, in a hub between cache levels, etc.). In one embodiment, the local state indication enables a simpler implementation (e.g., MESI protocol, simplified controller, etc.) at a local storage level while the essence state indication enables a higher performance implementation (e.g., MEOSI protocol, better bandwidth, etc.) at another storage level. The essence state indications can be associated with a more complete coherence state indication of information in a particular level (e.g., clean shared, dirty shared, etc.) and the local state indications can be associated with an expedient state indication in that particular level (e.g., shared, modified, etc.). Additional information on the essence state indication external tracking and the local state indication tracking is presented in following sections of the description.

FIG. 1 is a block diagram of exemplary memory architecture 100 in accordance with one embodiment of the present invention. In one embodiment, memory architecture 100 includes an information state external tracking memory system. Memory architecture 100 includes levels 105, 110, 120, 130, 140 and 150. Levels 105, 110, 120, 130, 140 and 150 are storage levels. In one exemplary implementation, storage level 105 can be considered a processing level (e.g., including registers, flip flops, etc.), storage levels 110, 120 and 130 can be considered a cache level (e.g., including L1 cache, L2 cache, L3 cache, etc.), storage level 140 can be considered a backing store or main memory level (e.g., RAM, DRAM, etc.) and storage level 150 can be considered bulk storage (e.g., hard disk, CD, etc.). The storage levels 105, 110, 120, 130, 140 include storages components 111, 121, 131, 141 and 151. In one embodiment, memory architecture 100 includes optional hub component 170

Information stored in components of memory architecture 100 can be associated with state indications. A state indication can include an indication of the status of information in a storage component (e.g., shared, modified, dirty, etc.). The status indication can be utilized to trigger or coordinate actions or processing that is to be performed related to the information (e.g., allocate a storage space, write back, not allocate, not write back, etc.). In one exemplary implementation, information in a storage component (e.g., cache, memory, etc) is associated with an essence state indication (e.g., owned, clean, dirty, modified, etc.) that is tracked externally. Information in the storage component can also be associated with a local state indication (e.g., shared, modified, etc.) that is tracked by a local directory.

In one embodiment, storage level 110 includes storage component 111 and an indication of the essence state of information associated with storage component 111 is tracked externally to storage component 111. An indication of the essence state of information associated with storage component 111 can be tracked by components in storage level 120. In one exemplary implementation, the essence state of information associated with storage component 111 is tracked by a hub (e.g., similar to hub component 170, etc.). It is appreciated a local state of information can be tracked by storage component 111 and can be different than the essence state of information associated with storage component 111 tracked externally from storage component 111.

Actions or operations in system 100 can be based upon storage states. In one embodiment, storage component 111 writes back information in various local states to level 120. However, storage space for the written back information is allocated in storage component 121 based upon the indication of the essence state tracked externally to storage component 111. In one embodiment, an essence state tracked externally to storage component 111 can be utilized to establish a local storage state for level 120 and information can also be written back from storage level 120 to storage level 130 accordingly. In one exemplary implementation, information tracked as shared locally in level 110 can be tracked externally by level 120 as owned and written back to level 130 in accordance with the owned state indication. It is appreciated a write back from one level to another level can occur at various times (e.g., written back as it is allocated in level 120, written back upon eviction from level 120, etc.).

FIG. 2 is flow diagram of exemplary method 200 in accordance with one embodiment of the present invention.

In block 210, an essence storage state indication and a local storage state indication are tracked. In one embodiment, information associated with a storage component included in one storage level is tracked externally from the storage level local state directory. In one embodiment, the storage levels can be cache levels and a local storage state of a cache line in a storage component can be tracked by the storage component as one status (e.g., shared, modified, etc.) and the essence state of the cache line can be tracked externally as a similar status or another status (e.g., owned, dirty, etc.).

In block 220, information in the one level storage component is acted upon at the one storage level based upon a local storage state indication. In one embodiment, the one level storage component writes back information in a plurality of storage states. In one exemplary implementation, in addition to information in a modified state, information in a shared state and exclusive state are also written back to another storage component in another storage level.

In block 230, the information received in the other storage component is acted upon based at least in part on the essence storage state of the information. In one embodiment, the other level storage component receives write backs from the one level storage component and acts upon the information, including disregarding extraneous write backs based upon the essence storage state and allocating storage space for remaining information. In one exemplary implementation, the other level storage component creates its own local state indication based at least in part upon an essence state indication and acts upon the information based upon its own local state indication (e.g., forward write backs to yet another storage level, etc.).

In one embodiment, a storage state indication tracked externally includes different information than what a storage state indication tracked internally otherwise indicates. In one exemplary implementation, externally tracked information includes additional information (e.g., more detailed information, refined information, etc.) than what first-level directories otherwise actually indicate (e.g., owned vs. shared). The externally tracked information can include information established by combining the information across multiple first-levels and keeping a history of how the first levels got to the current state. A conventional a single first-level approach can not typically conveniently track this additional information as it does not know what the other first-levels are up to or what they've done. A first coherency maintenance approach (e.g., similar to MESI, etc.) can be implemented at the first level storage component while the storage state indication tracked externally is compatible with a second coherency maintenance approach (e.g. similar to MOESI, etc.), and the second coherency maintenance approach is implemented at the second level storage component.

It is appreciated that the presented systems and methods can be readily implemented in a variety of configurations and environments. There can be a plurality of peer storage components in a similar storage level of a storage architecture. The tracking of an essence state can be implemented at least in part by a write-back write-allocate exclusive next-level component. There can different types of coherency protocols implemented at different storage levels. In one exemplary implementation, a first protocol can be similar to a MESI coherence protocol except modified to write back information in a plurality of different states (e.g., shared and exclusive in addition to modified, etc.) upon eviction and the second protocol can be similar to a MOESI coherence protocol. The storage component can be a cache component at a cache memory architecture level.

Figure 3:
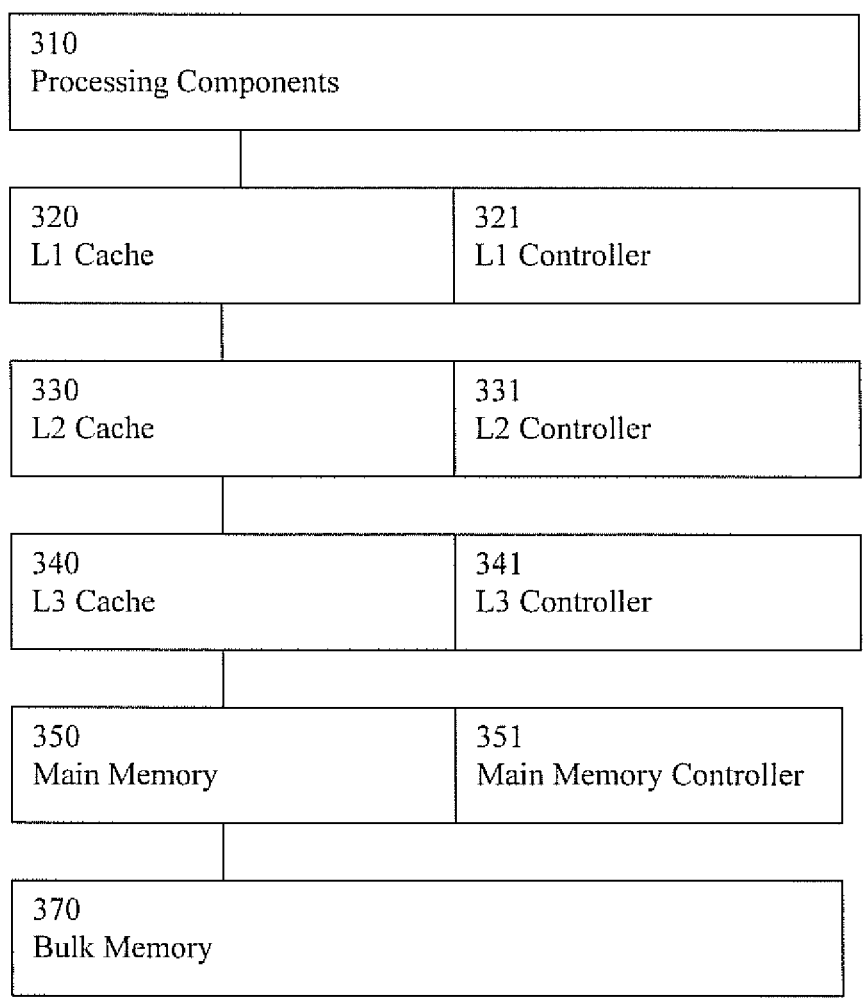
FIG. 3 is a block diagram of an exemplary memory architecture in accordance with one embodiment of the present invention.

FIG. 3 is a block diagram of an exemplary memory architecture 300 in accordance with one embodiment of the present invention. Memory architecture 300 includes processing components 310 (e.g., registers, flip flops, etc.), level one (L1) cache 320, level two (L2) cache 330, level three (L3) cache 340, main memory 350 and optional bulk memory 370. Processing component 310 is coupled to L1 cache 320 which is couple to L2 which in turn is coupled to L3 cache 340. L3 cache is coupled to main memory 350 which in turn can be coupled to optional bulk memory 370. In one embodiment, level one cache 320 can include a level one cache controller 321, level two cache 330 can include a level two cache controller 331, level three cache 340 can include a level three cache controller 341. The cache controllers can include directories for tracking status indications.

The components of system 300 can cooperatively operate to implement multiple storage levels. In one embodiment, an L3 cache includes a line if it is not contained in an L2 cache. When an L2 cache requests a line, the result can be a hit or a miss. If the result is a hit in the L3 cache, the line is sent to the L2 cache and invalidated in the L3 cache. If the result is a miss in the L3 cache, the request is sent to memory, and the response is sent to the L2 cache without allocating a line in the L3 cache. Lines in the L3 cache are allocated upon eviction from the L2 cache. The L2 cache writes back cache lines in various states (e.g., modified, shared, exclusive, etc.) which facilitates allocation of unmodified (e.g. read-only, etc.) data that would otherwise not be allocated in the L3 cache and would have to be re-requested from memory.

In one embodiment, when the L3 cache receives an eviction from the L2 cache (e.g., which include information about whether the line was modified by the L2 cache or not, etc.), the L3 cache allocates the line. The L3 cache can replace a line already in the L3 cache. The replaced line can be evicted to another memory level (e.g., DRAM, backing store, etc.) if appropriate (e.g., if modified, owned, etc.).

In one exemplary implementation, tracking the essence state externally facilitates preservation of an exclusive property. In one embodiment, the L3 cache can track the line state of the lines in various L2 caches. In one exemplary implementation, if a line is shared in several L2 caches, then all but the last eviction from an L2 cache is ignored by the L3 cache. This can facilitate avoidance of a duplication of the line between the L3 cache and the remaining L2 caches with the line that could otherwise occur if a line in the L3 cache is allocated when each one of the L2 caches evicts the "shared" line. Without the present system duplication avoidance features, a duplication may otherwise lead the L3 cache to become no longer exclusive with respect to the L2 caches and also effectively diminish the capacity of the L3 cache, In one embodiment, the L3 has directories that track the state of the line in the various L2 caches and the L3 cache implements an Owned state (e.g., similar to MOESI protocols, etc.) without modifying the L2 caches (e.g., similar to MESI protocols, etc.) beyond the modification to have the L2 caches evict clean lines to the L3 cache for allocation in the L3 cache. The duplicate directories for the L2 caches in the L3 cache can track whether the line has been modified by any of the caches since it was last fetched from DRAM, and even though several of the L2s may have the line in the shared state, the external duplicate directories can track that the line has been modified and when evicted (from the L3) it needs to be written back to its home, rather than silently invalidated.

In one embodiment, the external duplicate directories for the L2 cache can distinguish between a 'clean shared' state, which indicates that the line need not be written back to DRAM if evicted, and a 'dirty shared' state which indicates that it has, at some point, been modified since it was fetched from DRAM and hence ultimately needs to be written back. When the last L2 cache writes back a 'dirty shared' line to the L3, the L3 can allocate it in the modified state in the L3 so that it is written back to DRAM if evicted from the L3, even though the actual L2 cache evicting that the line thinks that it was merely shared (and clean). However, if when the last L2 writes back a 'clean shared' line to the L3, the L3 can allocate it in the shared state (or unmodified state), meaning that it need not be written back to DRAM if evicted from the L3.

In one embodiment, DRAM bandwidth savings similar to a MOESI protocol implemented at the L2 level, without significantly changing the L2 caches that would otherwise be involved with a MESI protocol. In one exemplary implementation, an L2 cache is similar to a MESI protocol except for an elegant modification to write back or out lines in a variety of states upon eviction so that they can be allocated in the L3 as necessary. There can be additional bandwidth between the L2 caches and the L3 cache when such lines are shared, as only the last eviction from an L2 cache really needs to send the line to the L3 cache. However, as the majority of lines are often present in only one agent, the additional bandwidth (e.g., to the L3 cache and not to DRAM, etc.) is typically small and often on-die with far higher available bandwidth than off-die when going to DRAM. Thus, it can be important to conserve or reduce consumption of DRAM bandwidth as compare to conventional approaches, even if on-die bandwidth is not conserved or reduced as on-die bandwidth is often more available or plentiful. Even thought there may be additional bandwidth consumption, the L2s caches and controllers can be kept relatively simple (e.g., implement a relatively simple protocol, implement a protocol similar to MESI, etc.). It is appreciated that while much of the detailed description was described in term of L2 and L3 caches, the approach can be utilized and implemented in a variety of configurations with a variety of different storage configurations. In one exemplary implementation, the peer cache or lower level cache can be an L1 cache and the write-back write-allocate exclusive next-level cache can be an L2 cache.

It is appreciated that a reference to a first level storage or cache and a second level storage or cache can be utilized to indicate that the levels are different with respect to one another rather than an absolute position in a hierarchy. For example, in memory architecture 300, L1 cache can be a first level with respect to a second level L2 cache and while L2 cache can be a first level with respect to a second level L3 cache. In one embodiment, a first level storage component can be an L2 cache and a second level storage component can be an L3 cache. The storage state of the cache line in the L2 cache can be tracked by various components. The storage state of the cache line in the L2 cache can be tracked by the L3 cache. The storage state of the cache line in L2 can be tracked by a coherent hub.

While many of the embodiments are described with caches and tracking on a single die or chip, it is appreciated the present systems and methods can be utilized in a various configurations. In one embodiment, the systems and methods can be flexibly scaled up. In one exemplary implementation, components can be distributed on different chips. A coherent hub that externally tracking storage states can be on a different die or chip. There can be multiple CPUs each with different L2s in different dies that use a shared memory as backing store. The externally tracking of the cache line states of the L2s can be in various components (e.g., a coherent hub on a die in a network, a component or L3 not necessarily on the same die as an L2, etc.).

Figure 4:
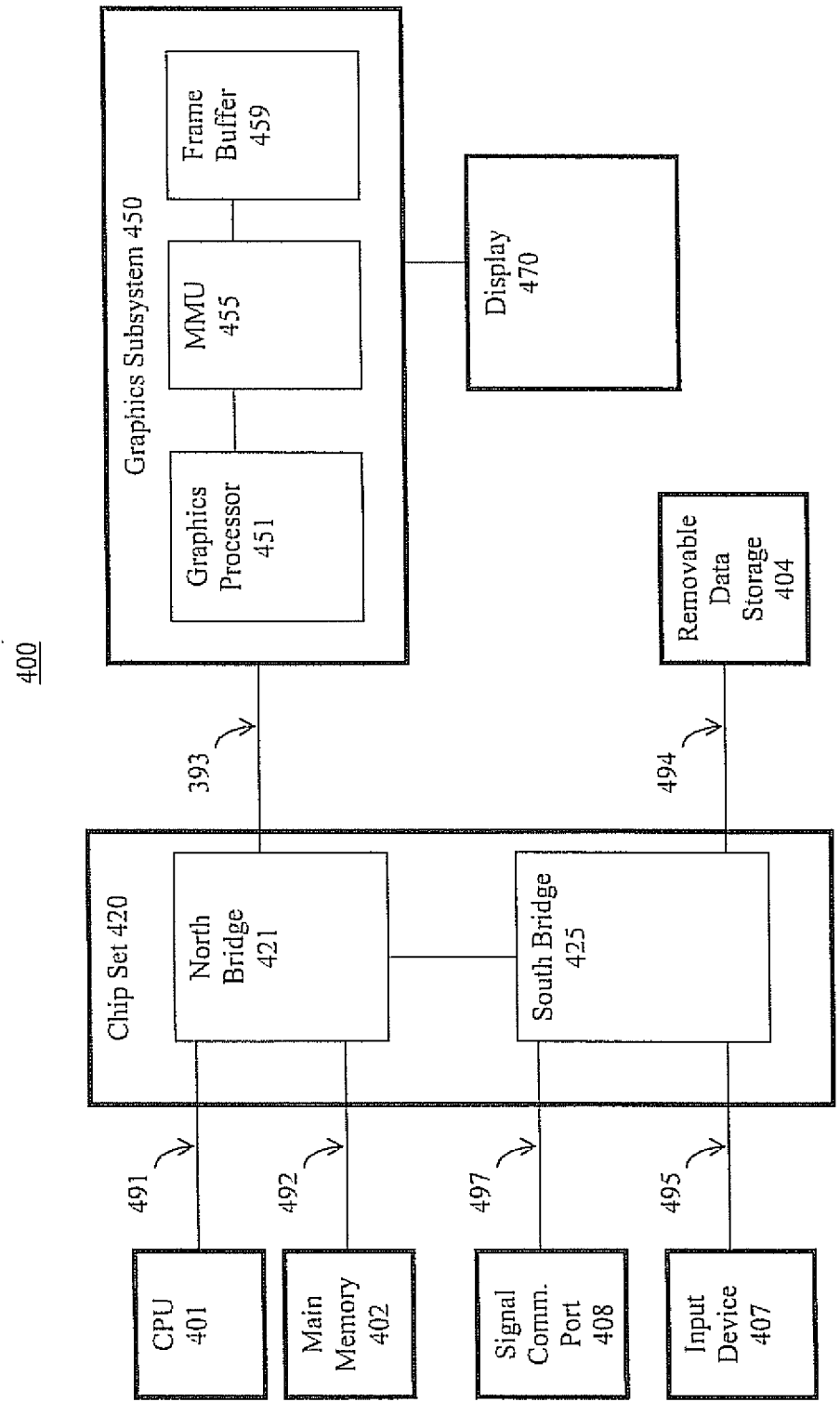
FIG. 4 is a block diagram of a computer system, one embodiment of a computer system upon which embodiments of the present invention can be implemented.

FIG. 4 is a block diagram of a computer system 400, one embodiment of a computer system upon which embodiments of the present invention can be implemented. Computer system 400 includes central processor unit 401, main memory 402 (e.g., random access memory), chip set 420 with north bridge 421 and south bridge 425, removable data storage device 404, input device 407, signal communications port 408, and graphics subsystem 450 which is coupled to display 470. Computer system 440 includes several busses for communicatively coupling the components of computer system 400. Communication bus 491 (e.g., a front side bus) couples north bridge 421 of chipset 420 to central processor unit 401. Communication bus 492 (e.g., a main memory bus) couples north bridge 421 of chipset 420 to main memory 402. Communication bus 493 (e.g., the Advanced Graphics Port interface) couples north bridge of chipset 420 to graphic subsystem 450. Communication buses 494-497 (e.g., a PCI bus) couple south bridge 425 of chip set 420 to removable data storage device 404, input device 407, signal communications port 408 respectively. Graphics subsystem 450 includes graphics processor 451, memory management unit 455 and graphics buffer 459.

The components of computer system 400 cooperatively operate to perform a variety of processing tasks and facilitate efficient memory accesses. Communications bus 491, 492, 493, 494, 495 and 497 communicate information. Central processor 401 processes information. Main memory 402 stores information and instructions for the central processor 401. Removable data storage device 404 also stores information and instructions (e.g., functioning as a large information reservoir). Input device 407 provides a mechanism for inputting information and/or for pointing to or highlighting information on display 470. Signal communication port 408 provides a communication interface to exterior devices (e.g., an interface with a network). Display device 470 displays information in accordance with data stored in frame buffer 459. Graphics processor 451 processes graphics commands from central processor 401 and provides the resulting data to graphics buffers 459 for storage and retrieval by display monitor 470. Memory management unit 455 handles the memory access requests between graphics processor 451 and graphics buffers 459. It is appreciated that similar memory management units can be implemented to facilitate efficient and independent access requests to other memory components of computer system 400, including main memory 402 and bulk data storage 404.

It is appreciated that the present invention can be implemented in a variety of embodiments. In one exemplary implementation the present invention can be utilized in processing systems utilized to provide a variety of graphics applications including video games. For example, the present invention can be utilized in a game console, personal computer, personal digital assistant, cell phone or any number of platforms for implementing a video game. It is also appreciated that references to video game application implementations are exemplary and the present invention is not limited to these implementations.

Again, it is appreciated that while much of the detailed description was described in terms of L2 and L3 caches, the present approach can be utilized and implemented in a variety of configurations with a variety of different storage configurations. In one embodiment, complexity is introduced only at the L3, which can be an optional component of the system.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system comprising:
   a first level storage component in which a storage state indication is tracked externally, wherein a first coherency maintenance approach is implemented at the first level storage component while the storage state indication tracked externally is compatible with a second coherency maintenance approach, wherein the first level storage component is an L2 cache; and
   a second level storage component for receiving information from the first level storage component and acting upon the information based at least in part on the storage state of information associated with the first level storage component, wherein the second coherency maintenance approach is implemented at the second level storage component, wherein the second level storage component is an L3 cache.

2. The storage system of claim 1 wherein the state information is the state of a cache line.

3. The storage system of claim 2 wherein the storage state of the cache line is tracked by the second level storage component.

4. The storage system of claim 2 wherein the storage state of the cache line is tracked by a coherent hub.

5. The storage system of claim 2 wherein the storage state of the cache line in the L2 cache is tracked by the L3 cache.

6. The storage system of claim 2 wherein the storage state of the cache line is tracked by a coherent hub.

7. The storage system of claim 2 wherein the L2 cache considers the cache line in a MESI state and the L3 cache actually tracks which lines have actually been written back to backing store.

8. The storage system of claim 2 wherein on eviction of a cache line from the L2 cache, the L3 cache actually propagates the cache line to the backing store if appropriate and does not propagate the cache line if not appropriate.

9. The storage system of claim 2 wherein the L3 cache tracks extra states for each cache line and wherein the extra states indicate if a line in the L2 cache is dirty and a directory of the L3 cache indicates that the line is to be written back.

10. A method:
   tracking and storing a storage state of information associated with a first storage component included in a first storage level externally, wherein a first coherency maintenance approach is implemented at the first storage level while the storage state indication tracked externally is compatible with a second coherency maintenance approach, wherein the first coherency maintenance approach is different than the second coherency maintenance approach;
   acting on the information in the first storage component based upon a local storage state indication, wherein the local storage state indication is based upon the first coherency maintenance approach; and
   acting upon the information received in a second storage component based at least in part on the storage state of the information, wherein the second storage component is included in a second storage level, wherein the second coherency maintenance approach is implemented at the second storage level, and the first storage component is architecturally closer to a processor than the second storage component.

11. The method of claim 10 wherein the first storage component does not keep track of an owned state.

12. The method of claim 10 wherein the second storage component receives write backs from the first storage component and disregards extraneous write backs based upon the storage state.

13. The method of claim 10 wherein the second level storage component forwards write backs received from the storage component in accordance with the storage state.

14. A system comprising
a first level cache storage component in which a storage state indication is tracked externally, wherein a first coherency maintenance approach is implemented at the first level cache storage component while the storage state indication tracked externally is compatible with a second coherency maintenance approach, wherein the storage state indication indicates whether a cache line is in a clean shared state or a dirty shared state; and
a second level cache storage component for receiving information from the first level storage cache storage component and acting upon the information based at least in part on the storage state of information associated with the first level cache storage component, wherein the second coherency maintenance approach is implemented at the second level cache storage component, wherein the second level cache storage component allocates the dirty shared cache line in a modified state in the second level cache storage component so that the dirty shared cache line is written back to a third level storage component if evicted from the second level cache storage component.

15. The system of claim 14 wherein the dirty shared cache line is written back to the third level storage component if evicted from the second level cache even though one of the plurality of first level caches evicting the dirty shared cache line treats the dirty as a shared cache line that is merely shared and clean.

16. The system of claim 14 wherein a first level cache storage component writes back a clean shared line to the second level cache storage component and the second level cache storage component allocates it in the shared state or unmodified state, meaning that it need not be written back to DRAM if evicted from the second level cache storage component.

17. The system of claim 14 wherein the first level cache storage component also write back exclusive cache lines and unmodified cache lines.

18. The system of claim 14 wherein the second level cache storage component is a write-back write-allocate exclusive next-level cache.

19. The system of claim 14 wherein the second level cache storage component lines are allocated upon eviction from the first level cache storage component.

* * * * *